(No Model.)
R. ASHLEY.
SECONDARY BATTERY.
No. 595,132. Patented Dec. 7, 1897.
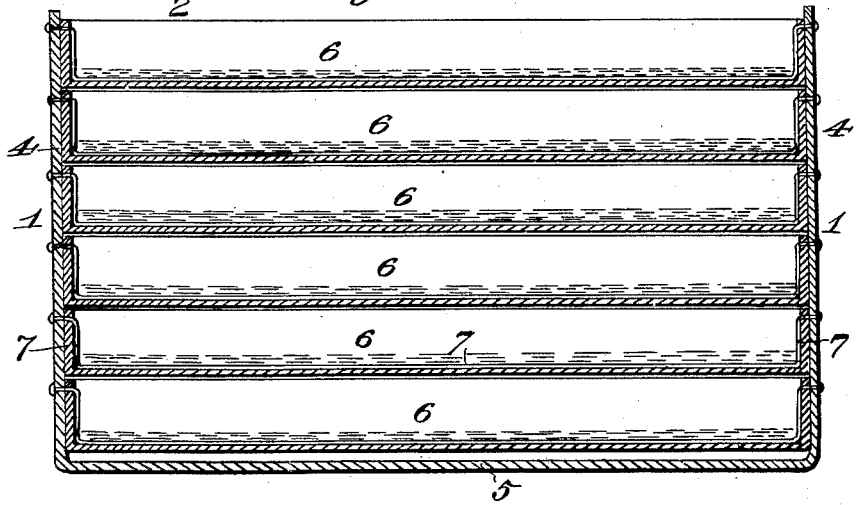
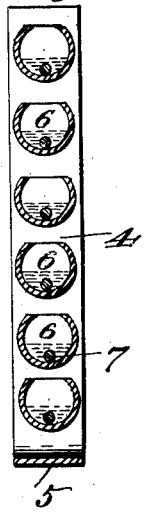
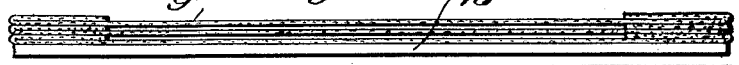
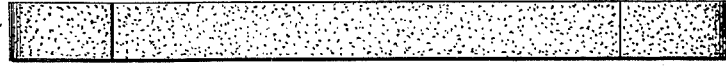
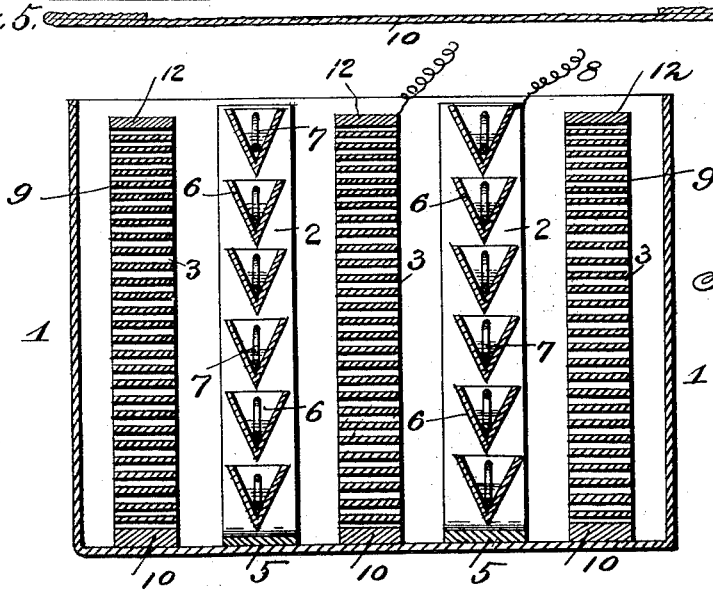
Witnesses
Franck L. Ourand.
Jo. L. Coombs
Inventor.
Ralph Ashley.
By Louis Bagger & Co.
Attorneys
THE NORRIS PETERS CO., PHOTO-LITHO., WASHINGTON, D. C.

UNITED STATES PATENT OFFICE.

RALPH ASHLEY, OF PORT REPUBLIC, NEW JERSEY, ASSIGNOR, BY DIRECT AND MESNE ASSIGNMENTS, TO THE GUARANTOR ELECTRIC COMPANY, OF NEW JERSEY.

SECONDARY BATTERY.

SPECIFICATION forming part of Letters Patent No. 595,132, dated December 7, 1897.

Application filed October 9, 1896. Renewed July 17, 1897. Serial No. 644,994. (No model.)

*To all whom it may concern:*

Be it known that I, RALPH ASHLEY, a citizen of the United States, and a resident of Port Republic, in the county of Atlantic and State of New Jersey, have invented certain new and useful Improvements in Secondary Batteries; and I do hereby declare that the following is a full, clear, and exact description of the invention, which will enable others skilled in the art to which it appertains to make and use the same, reference being had to the accompanying drawings, which form a part of this specification.

My invention relates to improvements in secondary or storage batteries; and its object is to provide an improved construction of the same whereby I secure important advantages with respect to efficiency in use; and the invention consists in the novel construction and combination of parts hereinafter fully described and claimed.

In the accompanying drawings, Figure 1 is a longitudinal sectional view of a secondary or storage battery constructed in accordance with my invention and taken through one of the negative electrodes. Fig. 2 is a similar view taken at a right angle thereto. Fig. 3 is a side elevation showing a portion of the positive electrodes. Fig. 4 is a plan view of the plates composing the positive electrodes. Fig. 5 is a sectional view of the same. Fig. 6 is a transverse section of the negative electrodes, showing a modified form of trough.

In the said drawings, which I have shown as a five-plate battery, the numeral 1 designates the cell, made of any suitable material, and located therein are two negative electrodes 2 and three positive electrodes 3, interposed therebetween.

No matter how many electrodes are employed, I use one more positive than negative, thereby reversing the ordinary construction of such batteries which have a plurality of negative electrodes.

The negative electrodes consist of a support preferably composed of lead and consisting of two vertical arms 4 and a horizontal arm 5, integral with each other and forming a U-shaped frame.

The numeral 6 designates a series of V-shaped troughs, of rubber, celluloid, or other insulating material, closed at each end by integral end pieces and superimposed one above the other.

Connected with the vertical arms of the support are copper or other conductors 7, which pass through holes in the ends of said troughs and then extend down and across the bottom of the trough. There is one of these conductors for each trough, and the ends thereof may be connected with said arms, rods, or supports by passing them through holes therein and then dropping a small quantity of solder on said ends, or in any other manner found convenient. The said frame or support is provided at its upper end with a conducting-wire 8.

The numeral 9 designates the plates composing the positive electrode consisting of thin flat strips of lead which are passed between grinding or abrading wheels rotating in opposite directions, whereby the surfaces of the strips are disintegrated and formed with a large number of interstices, making a very large area for the acid to act upon, and also making the same very porous. These plates have their ends bent over upon the body portion, forming, as it were, washers for separating the plates from each other to allow a free circulation of the acid therebetween. These plates rest upon a lead or other base-plate 10 and are provided with a top plate 12, and in forming the electrodes the said plates are placed in a suitable frame, with the ends projecting beyond the same, and are then clamped down therein. The said projecting ends of the plates are fused together to form a solid mass at each end of the electrode.

In carrying the invention into effect the positive and negative electrodes are alternately arranged in the cell, as usual, except that there is a plurality of positives, as shown in Fig. 2. The conductors in the bottom of the troughs of the negatives are then covered with mercury, and to prevent the latter from escaping the ends of the troughs are closed or formed with integral end pieces, as it is practically impossible to make a sufficiently tight joint by making the end pieces separate from the troughs. The cell is then filled with a sulfate-of-zinc solution and charged by passing a current of electricity therethrough, when pure zinc will be deposited in the troughs. In discharging, the zinc passes back into the solution. It will thus be seen that the mercury in the troughs will prevent the acid from attacking the copper and forming sulfate of copper.

By forming the plates of the positive electrodes of the thin lead strips subjected to an abrading or grinding action they will be very porous, so as to allow a plurality of such electrodes to be employed, which I have found by experiment will possess important advantages with respect to electrical energy or result produced.

In Fig. 6 the troughs of the negative electrode are shown as made in the form of a cylindrical tube with the upper portion cut away.

The plates which compose the positive electrode are formed by passing thin flat strips of lead between two grinding-wheels, such as coarse-emery wheels, whereby a large number of interstices or depressions are produced on the surfaces thereof. Proper lengths are then cut off and the ends bent back, as before described.

Having thus fully described my invention, what I claim is—

1. In a secondary or storage battery, the combination with the cell, the negative electrodes located therein, consisting of the U-shaped conducting-frames, the series of superimposed troughs provided with integral end pieces, and the conductors located in said troughs and their ends connected with the frame, of the positive electrodes consisting of a number of superimposed lead plates having their ends bent backward onto and secured to the main portion, so as to form spaces between said plates, substantially as described.

2. A positive electrode for a secondary or storage battery consisting of a number of thin flat plates having their ends bent over upon the main portion and superimposed upon and secured to each other and the surfaces of said plates formed with a large number of small interstices, substantially as described.

In testimony that I claim the foregoing as my own I have hereunto affixed my signature in presence of two witnesses.

RALPH ASHLEY.

Witnesses:
ANNIE ASHLEY,
HOWARD CHANNELL.